Sept. 13, 1966   H. A. FREEMAN   3,271,883
LANGUAGE LABORATORY APPARATUS
Filed June 17, 1963
FIG. 1
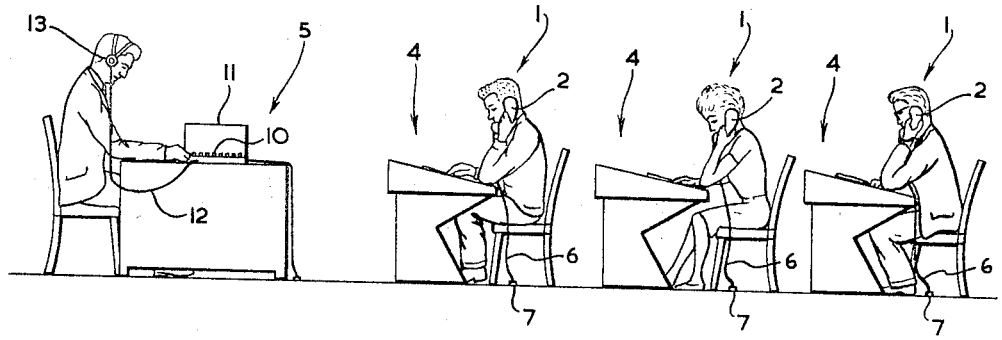
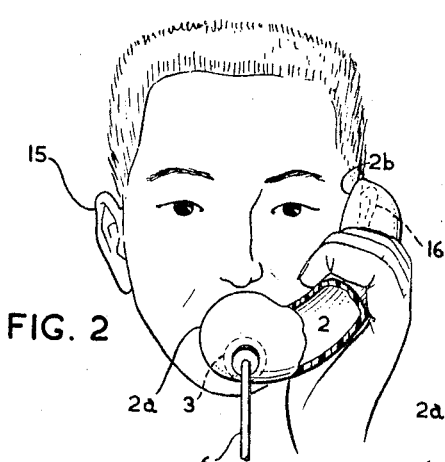
FIG. 2
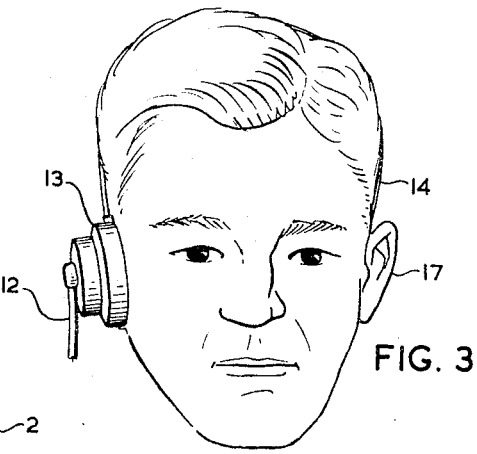
FIG. 3
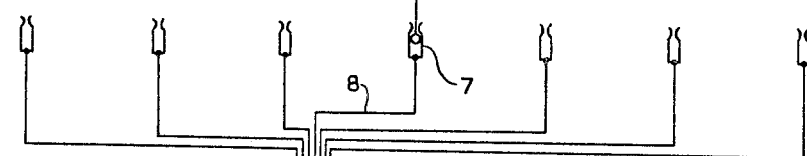
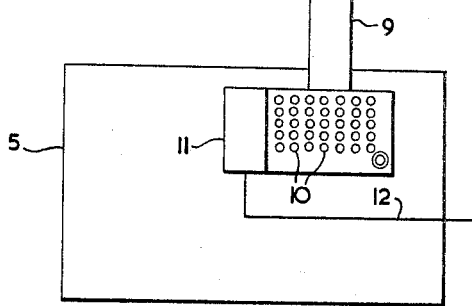
FIG. 4
INVENTOR
HAROLD A. FREEMAN
BY: Maybee & Legris
ATTORNEYS 3,271,883
LANGUAGE LABORATORY APPARATUS
Harold A. Freeman, c/o McMaster University,
Hamilton, Ontario, Canada
Filed June 17, 1963, Ser. No. 288,120
1 Claim. (Cl. 35—35)

This invention relates to the art of communication between a teacher and students, and to language laboratory apparatus for such communication.

In conventional language laboratories, it is usual to divide a classroom into several compartments, one for each student, so that each student can speak without disturbing the others, and to provide rather expensive electrical apparatus for each student and for the teacher, the apparatus providing for individual communication between each student and the teacher.

It is an object of this invention to simplify the apparatus for language laboratories, and to obtain, in an inexpensive way, individual communication from each student to a teacher, each student being able to hear his own voice without being heard by other students.

The invention is illustrated by way of example in the accompanying drawings in which:

FIG. 1 shows part of an ordinary classroom equipped as a language laboratory;

FIG. 2 shows a student using the speaking tube with which he is provided in the language laboratory of FIG. 1, the speaking tube being shown partly in section;

FIG. 3 shows the teacher using the headset with which he is provided; and

FIG. 4 is a schematic circuit diagram of the language laboratory apparatus of FIG. 1.

Each student 1 is provided with a curved speaking tube 2 of a size that he can hold in one hand. The tube 2 consists of a hollow sound conduit with one open end 2a adapted to fit closely to the student's mouth and with an opposite open end 2b adapted to fit closely to his ear. The tube provides a closed passageway which conducts the student's voice from his mouth to his ear so that his voice is clearly audible to himself but substantially inaudible to other students nearby. Within the conduit is a microphone 3 for transmitting the student's voice from the student's desk or station 4 to the teacher's desk or station 5. Thus, each microphone has a cord 6 that plugs into a jack 7 at the student's station, each jack 7 being connected by a line 8 that runs through a cable 9 to the teacher's station. By means of buttons 10 at his station, the teacher can connect any one of the lines 8 in series with an amplifier 11 and a cord 12 running to the earphone 13 of a teacher's headset 14. Thus, by pressing the button 10 corresponding to a particular student, the teacher can select the line 8 from any student and can hear what that student is saying into his speaking tube 2.

With the apparatus described, it is not necessary to arrange the students in separate compartments. Rather, the teacher and students are arranged in an ordinary unpartitioned classroom at positions where the voice of the teacher is clearly audible to the free and unaided ear 15 of each of the students. The teacher may speak a phrase in a foreign language. Each student, having heard the teacher speak, can repeat the phrase into his speaking tube 2 which conducts the student's voice to his ear 16 through the confined air passageway within the tube. As seen in FIGURE 2, the end 2a of the tube is sufficiently large substantially to cover the student's mouth with his nose outside the tube. The students do not hear one another, but the voice of each can be electrically transmitted through his microphone to the teacher's position where the teacher can listen in to hear how the student is progressing. The teacher has a free ear 17 so that he can hear his own voice as well as anything that a student may wish to say to everyone in the classroom. The teacher may of course be provided with a headset having an earphone for both ears, but one earphone should be movable away from his ear 17. The microphone 3 in the speaking tube 2 may be moved to a location near the end 2b, to be spaced somewhat farther from the student's mouth.

A student speaking fairly softly can hold the end 2a of the tube a short distance away from his mouth and still achieve the desired result of hearing himself, and enabling himself to be heard by the teacher via the microphone, without disturbing other students.

What I claim as my invention is:

A language laboratory comprising an unpartitioned room having a teacher station and a plurality of student stations where the voice of a teacher at the teacher station is clearly audible to the unaided ear, a curved speaking tube at each student station and of a size that can be held in one hand, the speaking tube comprising a hollow sound conduit having an open end that can be positioned close to a student's mouth with an opposite end held to one of his ears while leaving his other ear unobstructed to hear the teacher's voice unaided, the conduit apart from said open ends being closed to conduct the student's voice along the hollow conduit from his mouth to his said one ear so that his voice is clearly audible to him but substantially inaudible at the other student stations, the first mentioned open end being sufficiently large substantially to cover the student's mouth with his nose outside the tube, a microphone in each conduit for picking up the student's voice, electrical means for transmitting the student's voice from the microphone to the teacher station, an earphone at the teacher station, and means at the teacher station for selectively connecting the earphone to the electrical means from the different student stations whereby each student's voice can be clearly heard by the teacher but not by other students.

References Cited by the Examiner

UNITED STATES PATENTS

| 2,607,857 | 8/1952 | Baker. | |
| 3,069,789 | 12/1962 | Knight et al. | 35—35.3 |
| 3,098,307 | 7/1963 | Caldwell | 35—35.3 |
| 3,182,746 | 5/1965 | Schaeffer | 181—20 |

FOREIGN PATENTS

| 214,420 | 7/1941 | Switzerland. |

EUGENE R. CAPOZIO, *Primary Examiner.*

LAWRENCE CHARLES, *Examiner.*

WILLIAM GRIEB, *Assistant Examiner.*